(12) United States Patent
Modir et al.

(10) Patent No.: US 11,843,544 B2
(45) Date of Patent: Dec. 12, 2023

(54) SYSTEM AND METHOD FOR CONTROLLING ACCESS TO PROJECT DATA AND TO COMPUTING RESOURCES THEREFOR

(71) Applicant: The Toronto-Dominion Bank, Toronto (CA)

(72) Inventors: Amir Mahmood Modir, Toronto (CA); James Anthony Begg, Toronto (CA); ZeZhong Zheng, Toronto (CA); Sertac Kabadayi, Toronto (CA); Tadd Axon, Waterdown (CA); Mark Edward Carter, Toronto (CA); Nikita Islamov, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 28 days.

(21) Appl. No.: 17/711,197

(22) Filed: Apr. 1, 2022

(65) Prior Publication Data
US 2023/0318987 A1  Oct. 5, 2023

(51) Int. Cl.
*H04L 47/762* (2022.01)
*H04L 47/78* (2022.01)
*H04L 47/783* (2022.01)
*H04L 47/80* (2022.01)

(52) U.S. Cl.
CPC ......... *H04L 47/762* (2013.01); *H04L 47/783* (2013.01); *H04L 47/788* (2013.01); *H04L 47/808* (2013.01)

(58) Field of Classification Search
CPC ... H04L 47/762; H04L 47/783; H04L 47/788; H04L 47/808
See application file for complete search history.

(56) References Cited

U.S. PATENT DOCUMENTS

| | | |
|---|---|---|
| 10,341,410 B2 | 7/2019 | Lander et al. |
| 10,372,928 B2 | 8/2019 | Yuan et al. |
| 10,715,524 B1 | 7/2020 | Paulus et al. |
| 10,909,255 B2 | 2/2021 | Peterson |
| 2020/0117826 A1 | 4/2020 | Lilly, Jr. et al. |
| 2020/0210455 A1* | 7/2020 | Margel ............... H04L 43/20 |
| 2021/0141920 A1 | 5/2021 | Khurana et al. |
| 2021/0234673 A1* | 7/2021 | Kurian ............. H04L 9/3234 |
| 2023/0127572 A1* | 4/2023 | Jacob ............ G06F 16/24542 707/755 |

* cited by examiner

*Primary Examiner* — Jung H Park
(74) *Attorney, Agent, or Firm* — CPST Intellectual Property Inc.; Brett J. Slaney

(57) ABSTRACT

A server device, system, method, and for controlling access to project resources is disclosed. The disclosure includes a processor, and a communications module and a memory coupled to the processor. The memory, when executed by the processor, causes the processor to generate a plurality of zones for a project, each zone defining a set of access rights to: i) a database; and ii) at least one tool. The processor configures each set of access rights to allow a proxy service to access the zones, and receives, from a client device and via the proxy service, an access query to access at least one zone. The processor provides the client device access to, via the proxy service, the at least one dataset and at least one tool of the at least one zone.

20 Claims, 9 Drawing Sheets

SYSTEM AND METHOD FOR CONTROLLING ACCESS TO PROJECT DATA AND TO COMPUTING RESOURCES THEREFOR

TECHNICAL FIELD

The following relates generally to controlling access to project data and to computing resources therefor, including restricted computing resources.

BACKGROUND

Implementing or completing projects in a variety of different industries often includes controlling access to certain computing resources (hereinafter also referred to as "restricted" computing resources). The project can involve a plurality of people/users/members, arranged in teams including multi-disciplinary teams, accessing a variety of different types and amounts of tools and data related to the project. For example, a project can require managing developer, businessperson, or testing access to restricted computing resources. Administering an access control system can be challenging owing to the complexity of access right interactions within these teams.

Further complicating matters, in some enterprises, computing resource users can be assigned to or interact with multiple projects, work within differing restricted computing resources, work under differing project management philosophies, all while relying upon different applications or devices with their particular configurations and applications. Administering an access control system that accounts for overlapping needs and requirements of a computing resource user, and the different applications (third party or otherwise), can be challenging as a result of the multitude of properties associated with a user.

Existing approaches to managing data privacy for projects focus on controlling computing resource access on a user basis. User focused approaches can include significant shortcomings. For example, a user with a high permission level may improperly be able to access projects not initially contemplated when the permission level was granted. Cumbersome administration may be required to monitor and maintain user properties. Higher credentialed users may share data, inadvertently, or in contravention of existing policies to pursue their own goals.

Improvements which increase the level of data security, and allow for stable, reproducible, scalable, responsive, configurable, or other advantages to computing resources access control and security are desirable.

BRIEF DESCRIPTION OF THE DRAWINGS

Embodiments will now be described with reference to the appended drawings wherein.

DETAILED DESCRIPTION

Figure 1A:
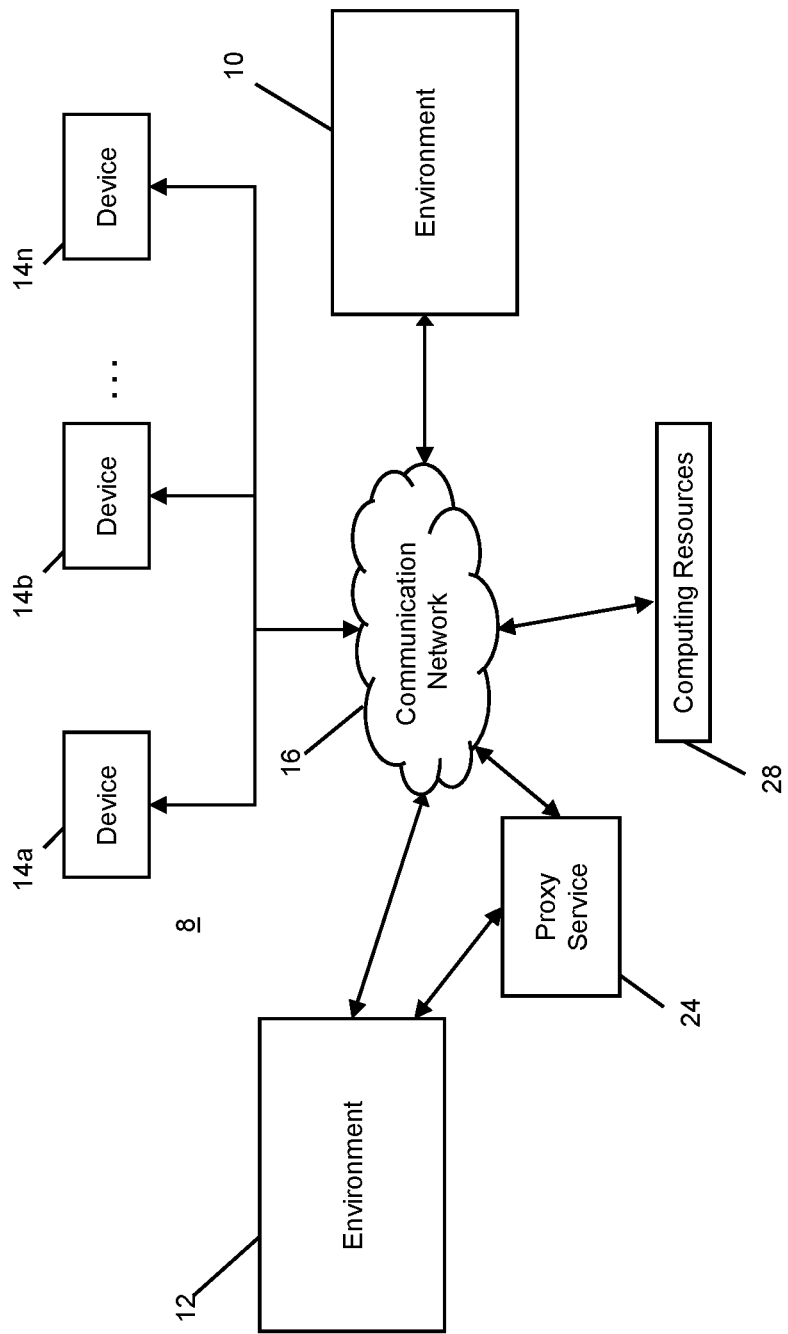
FIG. 1A is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

As used herein, a "zone" refers to a collection of computing resources or a data structure or service allowing access to the aforementioned collection of computing resources. The collection of computing resources is understood to refer to various combinations of components including computer executable software, firmware, hardware (e.g., a server, a dedicated special purpose processor, etc.), etc. The example zones discussed herein are recited as example embodiments and are not intended to be limiting. For the sake of clarity, among the various combinations contemplated by this disclosure, combinations where different components such as software are implemented on other dedicated special purpose processors, or on a combination of hardware in different physical locations (i.e., the hardware components are "remote" to one another, such as in a cloud computing environment) are contemplated. In the embodiment where the term zone refers to a data structure allowing access to the effort mentioned collection of computing resources, it is understood that the zone may replicate any software-based components locally and implement same on a hardware system (whether local or remote) or component, such as a server system. To provide further particularity, in at least some example embodiments, the term "zone" can refer to data (whether part of a single dataset or otherwise), or a data structure which can be interpreted by a machine to arrive at a dataset, where the access to the "zone" dataset is controlled or restricted.

In one aspect, the disclosed system, device, method (hereinafter referred to interchangeably) and computer executable software are used to address limitations in existing systems by providing a technical mechanism to rapidly, if not instantaneously, adjust computing resource access policies within one or more projects. The disclosed system generates a plurality of zones for a project, each zone being configured with access rights to at least one dataset within a database associated with the project, and at least one tool configured to operate on the at least one dataset. The zones are accessible to devices via a proxy service. In this way, adjustment of the registration of accounts or devices (hereinafter used interchangeably) within the proxy service, and their relation to the plurality of zones enables rapid implementation of computing resource access policies. Devices can be removed from zones, or zones themselves can be removed, allowing for rapid proliferation of policies without the need to identify devices. Similarly, zone permissions can be modified, allowing for rapid proliferation of policies without the need to identify individual devices associated with the zone.

In another aspect, the disclosed system may limit data breach exposure, and minimize the potential for data manipulation (whether inadvertent or malicious), by implementing one or more masking policies in response to determining that the computing resource is being accessed via the proxy service. For example, identifying information may automatically be masked in response to determining that the computing resource is being accessed via the proxy service, thereby entirely removing the ability of a device to misuse data within the zone. Similar policies can also be applied to tools within the zone.

In yet another aspect, the disclosed system can allow for increased interoperability between different applications. The proxy service can be maintained for a wide variety of applications and devices, without the need for such interoperability to be integrated into a plurality of different applications. Moreover, in at least one example embodiment, the disclosed system includes a hybrid approach, where specific software interoperability issues can be addressed by way of a bypass.

It will be appreciated that while examples provided herein may be primarily directed to controlling access to computing resources for a particular project, the principles discussed herein equally apply to applications deployed on or otherwise used in other applications which include collaboration and the need to restrict access to computing resources. Such applications may arise in a personal security context, for example. Similarly, while examples provided herein may be primarily directed to a software development environment in which executable tasks are implemented, whether they include development, testing, implementation, production, quality assurance, etc., and the disclosure is not intended to be limited to those examples.

In one aspect, a server device for controlling access to project data is disclosed. The server device includes a processor, a communications module coupled to the processor, and a memory coupled to the processor. The memory stores computer executable instructions that when executed by the processor cause the processor to generate a plurality of zones for a project, each zone defining a set of access rights to: i) at least one dataset in a database associated with the project; and ii) at least one tool configured to operate on the at least one dataset. The processor configures each set of access rights to allow a proxy service to access one or more of the plurality of zones. The processor receives, from a client device and via the proxy service, a data access query to access at least one zone of the plurality of zones, and provides the client device access to, via the proxy service, the at least one dataset and at least one tool of the at least one zone specified in the data access query.

In another aspect, a method of controlling access to project data is disclosed. The method is executed by a server device having a communications module and includes generating a plurality of zones for a project, each zone defining a set of access rights to: i) at least one dataset in a database associated with the project; and ii) at least one tool configured to operate on the at least one dataset. The method includes configuring each set of access rights to allow a proxy service to access one or more of the plurality of zones. The method includes receiving, from a client device and via the proxy service, a data access query to access at least one zone of the plurality of zones, and providing the client device access to, via the proxy service, the at least one dataset and at least one tool of the at least one zone specified in the data access query.

In another aspect, a non-transitory computer readable medium for controlling access to project data is disclosed. The computer readable medium includes computer executable instructions for generating a plurality of zones for a project, each zone defining a set of access rights to: i) at least one dataset in a database associated with the project; and ii) at least one tool configured to operate on the at least one dataset. The computer executable instructions are for configuring each set of access rights to allow a proxy service to access one or more of the plurality of zones. The computer executable instructions are for receiving, from a client device and via the proxy service, a data access query to access at least one zone of the plurality of zones, and providing the client device access to, via the proxy service, the at least one dataset and at least one tool of the at least one zone specified in the data access query.

In certain example embodiments, the server device can be configured to, in response to access to the dataset being granted via the proxy service, dynamically mask the dataset based on a policy defined for the at least one zone according to which the at least one dataset is accessed. The server device can also be configured to redirect data access queries to the plurality of zones from the client device to the proxy service.

In certain example embodiments the server device can be configured to update the unique set of access rights or a data masking policy associated with the at least one dataset based on a status of the project.

In certain example embodiments the server device can be configured to associate the client device, within the proxy service, with at least one further zone of another project.

In certain example embodiments the server device can be configured to associate the client device, within the proxy service, with more than one zone of the plurality of zones in the project simultaneously.

In certain example embodiments, the server device can be configured to update the proxy service to disassociate the client device and a zone of the plurality of zones to remove access by the client device to the zone.

In certain example embodiments, the server device can be configured to generate a further zone; assign the further zone to the project, wherein the further zone has a subset of the access rights of the at least one zone; and assign at least one client device to the further zone, preventing the at least one client device from having all access rights associated with the at least one zone.

In certain example embodiments, the server device can be configured to modify the unique set of access rights for the at least one zone, changing access rights to either the at least one dataset or the at least one tool for all client devices associated with the at least one zone.

In certain example embodiments, a dataset of the at least one dataset can be hosted on a jump server, and the dataset is directly accessible by a desktop client tool to mitigate client device security characteristics.

In certain example embodiments, the server device can be configured to update the unique set of access rights to remove access, via the proxy service, to the at least one zone, removing the at least one zone from the project.

Referring now to FIG. 1A, the diagram illustrates an exemplary computing environment 8. The computing environment 8 may be a computing environment solely controlled by a single entity or enterprise or may be a computing environment comprising various devices that are controlled by different parties. The computing environment 8 can be a single computing environment, or, as shown, the computing environment 8 can include various constituent or discretized project computing environments (e.g., constituent project environments 10 and 12 shown in FIG. 1A). Hereinafter, for ease of reference, reference to zone or resource access are understood to primarily reference zones or resources of the constituent project environments, unless otherwise stated. It is understood that the teachings applicable to the constituent project environments are similarly applicable in the context of a broader computing environment 8.

The computing environment 8 can be part of an enterprise or other organization that performs one or more aspects of a project, or performs multiple projects, or performs multiple project aspects concurrently. For example, the computing environment 8 can be controlled by a financial institution, which creates or upgrades website tools, upgrades existing financial infrastructure software, performs compliance or security testing to comply with regulatory requirements, performs marketing analysis or other customer data dependent analysis, or develops and tests applications, etc.

Devices for accessing the constituent computing environments are shown by the plurality of devices 14a, 14b, to 14n (hereinafter referred to interchangeably as device(s) 14). The devices 14 can be operated by various users to interact with the computing environment 8, such as contractors, employees, customers, etc. The devices 14 can be various different types of devices. For example, in FIG. 1A the devices 14 include a personal tablet device 14A, an enterprise issued desktop device 14B, and a mobile device 14C.

The computing environment 8, or each constituent project computing environment of the wider computing environment 8, includes at least some computing resources to which access is restricted (e.g., computing environment 8 includes computing resources 28). Access to computing resources may be restricted for a variety of reasons. The access may be controlled solely out of an abundance of caution, or the access may be controlled owing to the sensitive nature of the restricted resource. For example, in the context of a financial institution, the project environment 12 may be an environment used for website tool creation or upgrades, and computing environment 8 can stringently enforce access to computing resources 28 within project environment 12 as the computing resources 28 may include sensitive customer data (e.g., login credentials, customer financial data, etc.).

The computing resources 28 to which access is restricted are not limited to data, and can include software, hardware, or various combinations of said components. The hardware components can include terminals, servers, and/or databases, having one or more processors, communications modules, and database interfaces, and so forth. The software components can include tools for operating on or interacting with data, including various software solutions or computer executable instructions which manipulate or otherwise interact with data (e.g., one or more proprietary machine learning models used by the administrator of the computing environment 8). More particularly, the software components can include machine learning models to predict security flaws within a mobile device application, or models to detect fraud within certain databases, etc.

The computing environment 8 includes or is otherwise connected to a proxy service 24. As will be described in greater detail herein, the proxy service 24 provides, is configured to provide access to, or, as a result of the configuration of one of the constituent computing environments of computing environment 8, is able to provide access to, computing resources within the computing environment 8. The computing environment 8 can include one or more instances of the proxy service 24, with different instances providing access to different computing resources within the environment 8. For example, the proxy service 24 may be configured with credentials that allow the proxy service 24 to access the computing resources 28 generally available to the computing environment 8 or access computing resources limited to the project environment 10 (e.g., hardware 26A of FIG. 1B).

The various components of the computing environment 8 are connected to, or may be connected to one another, via a communications network 16. Communication network 16 may include a telephone network, cellular, and/or data communication network to connect different types of electronic devices. For example, the communication network 16 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet). The communication network 16 may not be required to provide connectivity between constituent elements of computing environment 8 where such connectivity is provided by an internal network.

In example embodiments, the computing environment 8 can include multiple enterprises or organizations, e.g., wherein separate organizations are configured to, and responsible for, separate constituent computing environments. For example, an organization may enter into a joint venture with another party for a project or perform a project that includes interfaces with a regulatory entity (e.g., government verified sign in services to access government resources). Similarly, an organization that develops an app may outsource the testing stages to a third party within another computing environment, particularly when testing is performed infrequently.

Each of the components of the computing environment 8 may include or otherwise have access to one or more repositories or other data storage elements for storing data. The data can include any code, metadata, client data, enterprise data or other data associated with and/or generated during controlling access to project data, whether in the form of files, reports, information, or results, within the computing environment 8.

The computing environment 8 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the project environment 12, proxy service 24, and/or project environment 10. The cryptographic server may be used to protect data within the computing environment 8 by way of encryption for data protection, digital signatures or message digests for data integrity, and by using digital certificates to authenticate the identity of the users and entity devices with which the project environment 12, proxy service 24, and project environment 10 communicate to inhibit data breaches by adversaries. It can be appreciated that various cryptographic mechanisms and protocols can be chosen and implemented to suit the constraints and requirements of the computing environment 8 as is known in the art.

It is understood that the project environment 12, proxy service 24, and project environment 10 may also be integrated into a single enterprise environment as sub-environments or components. That is, the configuration shown in FIG. 1A is illustrative only.

Figure 1B:
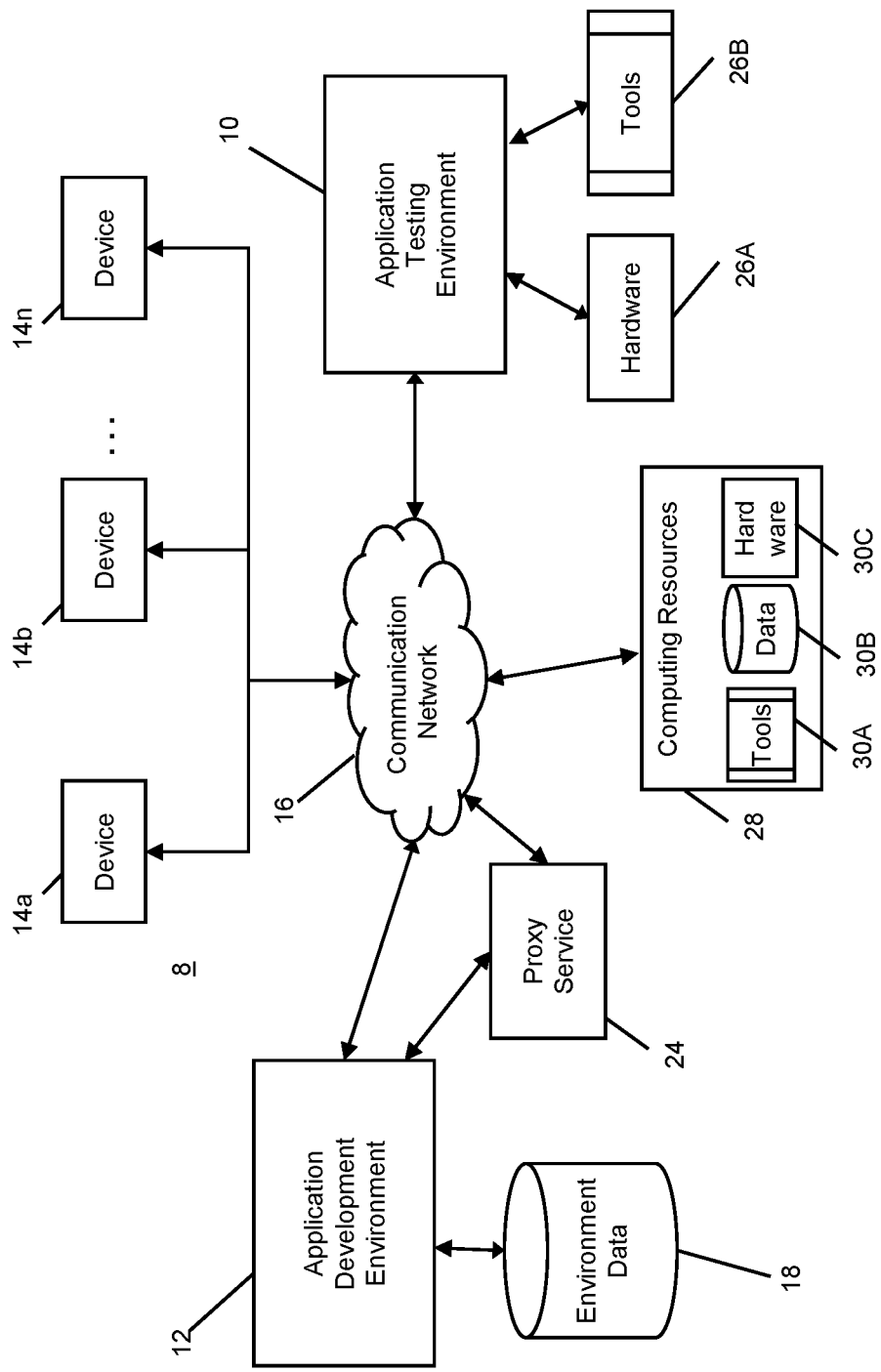
FIG. 1B is a schematic diagram of a further example computing environment.

For example, referring now to FIG. 1B, the diagram illustrates an embodiment where the exemplary computing environment 8 is used in an application production project. In this example, the computing environment 8 is controlled or maintained by a single entity (e.g., a software solution provider) and includes constituent computing environments including an application testing project environment 10, and an application development project environment 12.

As alluded to earlier, in the shown embodiment, the application testing project environment 10 includes environment specific hardware components 26A, and one or more tools 26B for operating on or interacting with data. Access to the hardware components 26A or one or more tools 26B may be restricted, for example, to adhere with certain regulatory schemes (e.g., regulatory requirements related to processing of financial or personal health data), financial constraints or constraints imposed by the organization (e.g., security reasons). Similarly, the application development project environment 12 may include locally hosted development data in the database 18.

In example embodiments, the environment specific computing resources are broadly available within the computing environment 8 and are not limited to a particular environment (e.g., data within database 18 may be accessible outside of the application development project environment 12).

The computing environment 8 can include the environment specific computing resources in addition to computing resources generally available within the computing environment 8. For example, as shown in FIG. 1B, computing resources 28 can also be generally available to the devices 14 in the computing environment 8. The computing resources 28, as shown, can include at least one tool 30A, a database or data storage 30B, or hardware components 30C, which constituent components are understood to be similar to the components described in reference to the other computing environments in computing environment 8.

Different constituent environment can be implemented to interact specifically with different devices 14. For example, the application deployment project environment 12 can be implemented in several different ways. The application deployment project environment 12 may be an internal deployment channel solely for employee devices 14, whereas the application testing project environment 10 may include a public marketplace such as an app store accessible to all devices 14, etc.

Figure 2:
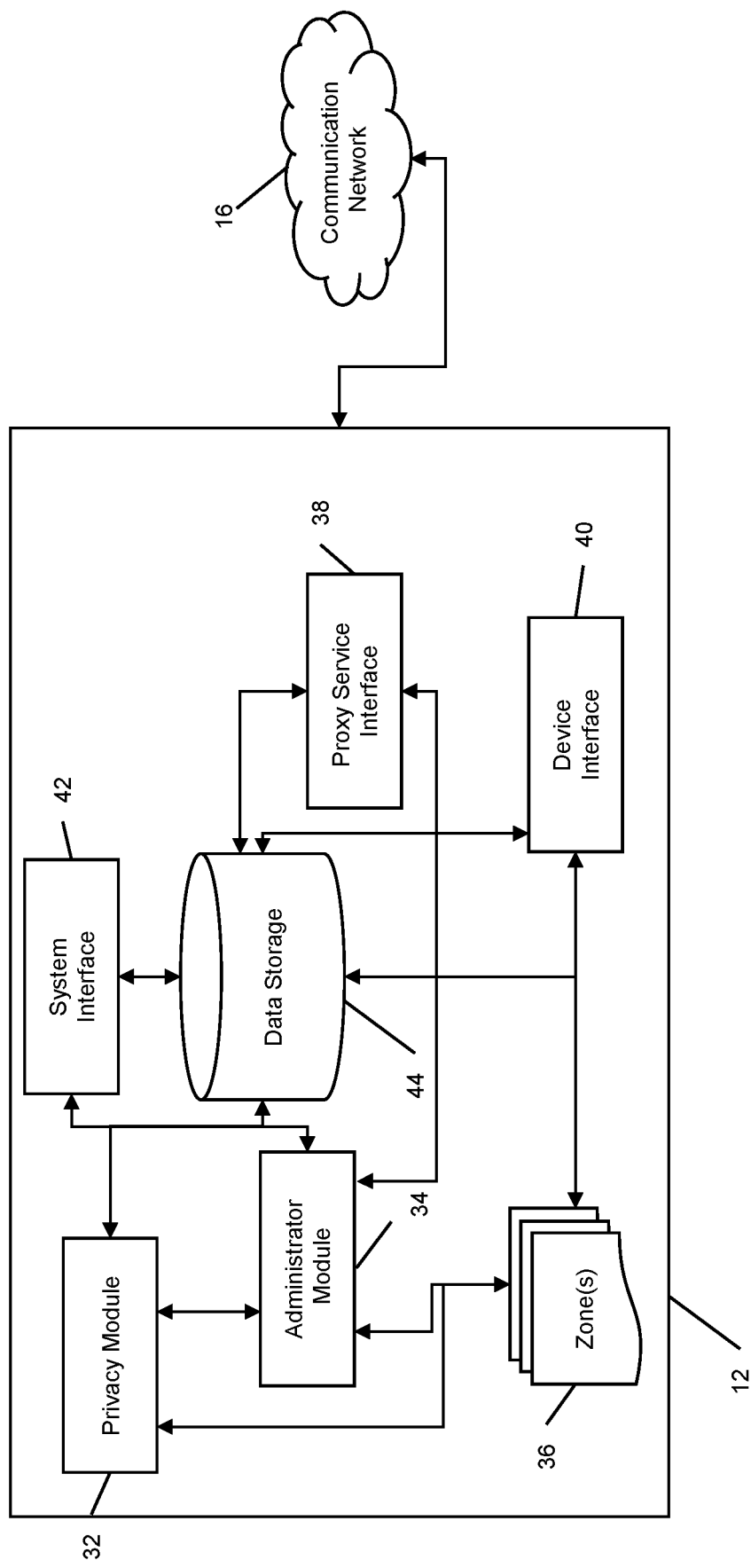
FIG. 2 is a block diagram of an example project computing environment for controlling access to project data.

Referring now to FIG. 2, a block diagram of an example project computing environment (in this example, project environment 12 of FIG. 1A), for controlling access to project data is shown. The features of example project environment 12 shown in FIG. 2 are periodically discussed with reference to the following example: project environment 12 can facilitate regulatory compliance testing and reporting, or auditing. That is, the project environment 12 can access data available throughout an enterprise and be used to develop or employ software tools to determine whether certain compliance requirements are met, or to generate reports based on the tool results.

The project environment 12 can include a privacy module 32, an administrator module 34, and one or more zones 36 (hereinafter referred to interchangeably as single or plural zone(s) 36).

As described herein, the zones 36 are a collection of computing resources (e.g., generally available computing resources 28, or environment specific computing resources such as database 18 of FIG. 1B), or a data structure allowing access to the collection of computing resources. Each of the zones 36 can be configured with different access rights. Relative to one another, zones 36 may have overlapping access rights, mutually exclusive access rights, or some zones 36 may have duplicate access rights (e.g., an enterprise policy may specify that different departments within an enterprise may be required to generate separate zones 36, notwithstanding zone overlap with an existing zone).

Each zone 36 is associated with at least one project. Each zone of the zones 36 can be related to a different project. For example, the project environment 12 may have multiple projects (e.g., a compliance project, a web application project, etc.), with each project having at least one of the plurality of zones 36. As an example, in the context of compliance testing and reporting, or auditing, different zones 36 can be established or generated to implement different types of compliance or auditing testing. The zones 36 can be used periodically to generate analysis/reporting results, for example, to satisfy quarterly obligations.

The privacy module 32 can be used to control the type and amount of computing resource access for each zone 36. In respect of a type of data, the privacy module 32 can be configured to permit a zone 36 to access raw data, locally copied data, particular types of data (i.e., account numbers, dates, social insurance numbers, etc.). In terms of an amount of data, the privacy module 32 can control the amount of data accessed or modifiable by the zone 36 to limit the exposure in the event of a data breach. For example, devices 14 accessing a zone 36 may be limited to accessing a particular amount of data within a particular timeframe to avoid the copying of data in database 30B on a large scale. To summarize in part, in the context of software solution development, for example, the privacy module 32 can be configured to, or can configure individual zones 36 to, have access solely to data relating to the development of a compliance application, and not to data related to the testing of the compliance application.

Similarly, the privacy module 32 can be used to control access to different tools (e.g., tools 30A). In at least some example embodiments, the privacy module 32 constrains tool functionality by requiring the tool be implemented within the zone 36, and restricting access, by the aforementioned zone 36, to sensitive data. For example, a machine learning tool which may benefit from training with larger datasets can be prevented from accessing specified databases. The access control related to tools can also prevent or lessen bias in tool use. For example, the tool 30A may be restricted to certain datasets that have been vetted as avoiding institutional or other types of bias required to generate accurate compliance results.

In addition to controlling access to the type and amount of computing resources available to each of the zones 36, the privacy module 32 can be used to implement one or more policies for each zone 36. In an example embodiment, the policy may be a data masking policy. For example, implementing the data masking policy within a zone 36 can include the zone 36 automatically masking accessed age data to remove particulars other than the year in which the individual is born in any data requested by a device 14. In example embodiments, the masking may take the form of modifying requests to access the restricted resources received from the zone 36. For example, the zone 36 may only be given the functionality to request data in accordance with the masking policy in place for the zone 36. The zones 36 can therefore leverage dynamic masking to minimize the amount of data that needs to be copied between projects and/or zones since entry into the zone 36 can trigger the masking according to various rules, permission levels, etc. The privacy module 32 can be configured to implement the one or more policies across all zones 36 for which it is responsible for, or a subset thereof. In at least one embodiment, the privacy module 32 is used to overcome the technical challenge of user-based privacy limitations by enforcing privacy limitations to controlled zones 36, with changes being propagated to multiple users without having to address individual user settings. To provide an example, in a compliance testing context, the policy limiting the use of compliance testing tools by users to data relevant to the compliance testing (e.g., if know your client rules are being implemented, client account data may be accessible, whereas client financial information may not be accessible), potentially speeding up compliance results for all users of the compliance test zone.

Administrator module 34 can be used to configure which computing resources are able to interact with the zone 36. As will be described herein, the administrator module 34 is used to receive and approve requests to generate zones 36 and access rights associated therewith. In example embodiments, the administrator module 34 can be used to determine whether computing resources local to the specific computing environment (e.g., project environment 12) are utilized by the zones 36, or whether computing resources available to the computing environment 8 generally (e.g., computing resources 28) are accessible by the zones 36. For example, the administrator module 34 can configure the project environment 12 to store build data, or other commercially sensitive data, or privacy-sensitive customer data within a local data storage 44, and to provide access to data storage 44 to the zones 36.

In example embodiments, the administrator module 34 controls which devices 14 can interact with the zone 36. The administrator module can control device 14 access by registering devices 14, or accounts associated with the devices 14 (e.g., via IP address, credentials, etc.), to zones 36, within the proxy service 24 (e.g., via the proxy service interface 38). For example, the administrator module 34 can register a device 14 associated with a project manager to a particular zone 36 within the proxy service 24, such that the proxy service 24 will respond to requests to access the zone 36 from the device 14. As alluded to herein, instances of the proxy service 24 may access multiple zones 36, or multiple instances of the proxy service 24 can be used to access a single zone 36, or multiple instances of the proxy service 24 can be used to access different zones 36.

The administrator module 34 can also be configured to direct requests to access a particular zone 36 received from the device 14 (e.g., via a device interface 40) to the proxy service 24 through which the particular zone 36 is accessed. In this way, the administrator module 34 can at least in part assess the veracity of the request to access the zone, providing another layer of security to implementations wherein data access is not user characteristics based. Similarly, directing all requests to zones 36 to the proxy service 24 can simplify the access architecture; multiple databases and user characteristics and properties do not have to be registered or considered, and the proxy service 24 can include all information necessary to grant access.

In at least some example embodiments, the administrator module 34 allows at least some devices 14 to access the zones 36 other than through the proxy service 24 (e.g., via system interface 42 to computing resources 28). For example, the administrator module 34 can direct requests from devices 14 associated with legacy systems, or having security software-based impediments, or having geographical impediments to accessing the proxy service 24 to directly access computing resources associated with the zone 36. In this way, a two-tiered data privacy scheme is implemented to overcome technical challenges associated with flexibility of existing architecture, and other implementation considerations.

Relatedly, changes to existing policies or access rights, or other configurations managed by either the privacy module 32 of the administrator module 34, or implementation of new policies, may be propagated to all zones 36 with which the privacy module 32 or the administrator module 34 is associated. For example, to address the technical challenge of propagating privacy policies within the computing environment 8, without impacting the organizational structure of the project, the described privacy module 32; can be used to update multiple zones and multiple projects simultaneously. More particularly, changes to masking policies can be implemented across a project or enterprise with a change in the privacy module 32, as the proxy service 24 provides access to the zones 36, and the zones 36 themselves are defined in part by the privacy module 32. By implementing the proxy service 24 architecture to determine device 14 relations to zones 36, access right management of the zones 36 is automatically propagated to all devices 14 accessing the zone 36. For example, where a zone 36 is established for auditing purposes, and where the scope of the audit has been increased, devices 14 with access to the zone 36 can all gain access to an increased scope by updating the zone 36 to grant access to a new database or tool, without making changes to specific device 14 rights. Similarly, changes to data masking policies can be updated for the zone 36, potentially making the audit more efficient by focusing solely on data relevant to the audit.

Different parties within the computing environment 8 may have varying degrees of access to the privacy module 32 or the administrator module 34. For example, the data masking policy configuration functionality of the privacy module 32 can be configured such that only data privacy experts within the computing environment 8, and not project managers, are able to access and configure policies.

It is noted that while the privacy module 32, the administrator module 34, the system interface 42, the proxy service interface 38, and the device interface 40 are shown as separate components, it is understood that the components may be subsystems or constituent elements of a single module, or any number of related modules. Hereinafter, these components shall collectively be referred to as a "resource privacy manager" or "RPM".

Figure 3A:
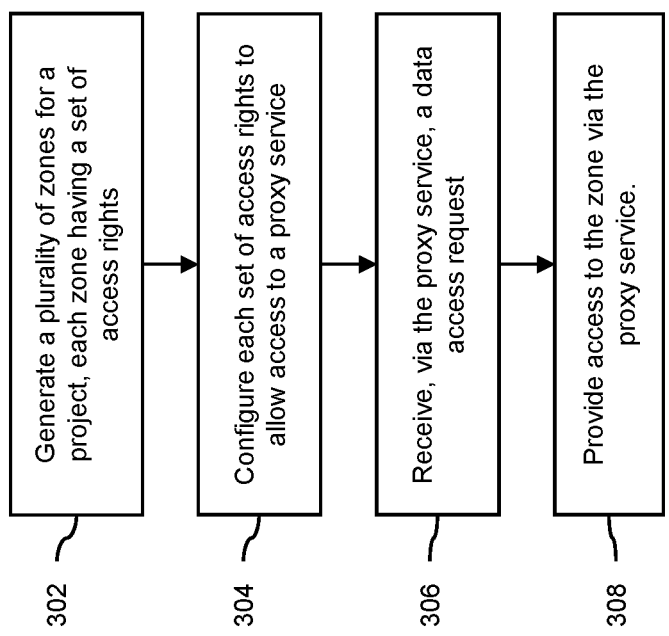
FIG. 3A is a flow diagram of an example of computer executable instructions for controlling access to project data.
Figure 3B:
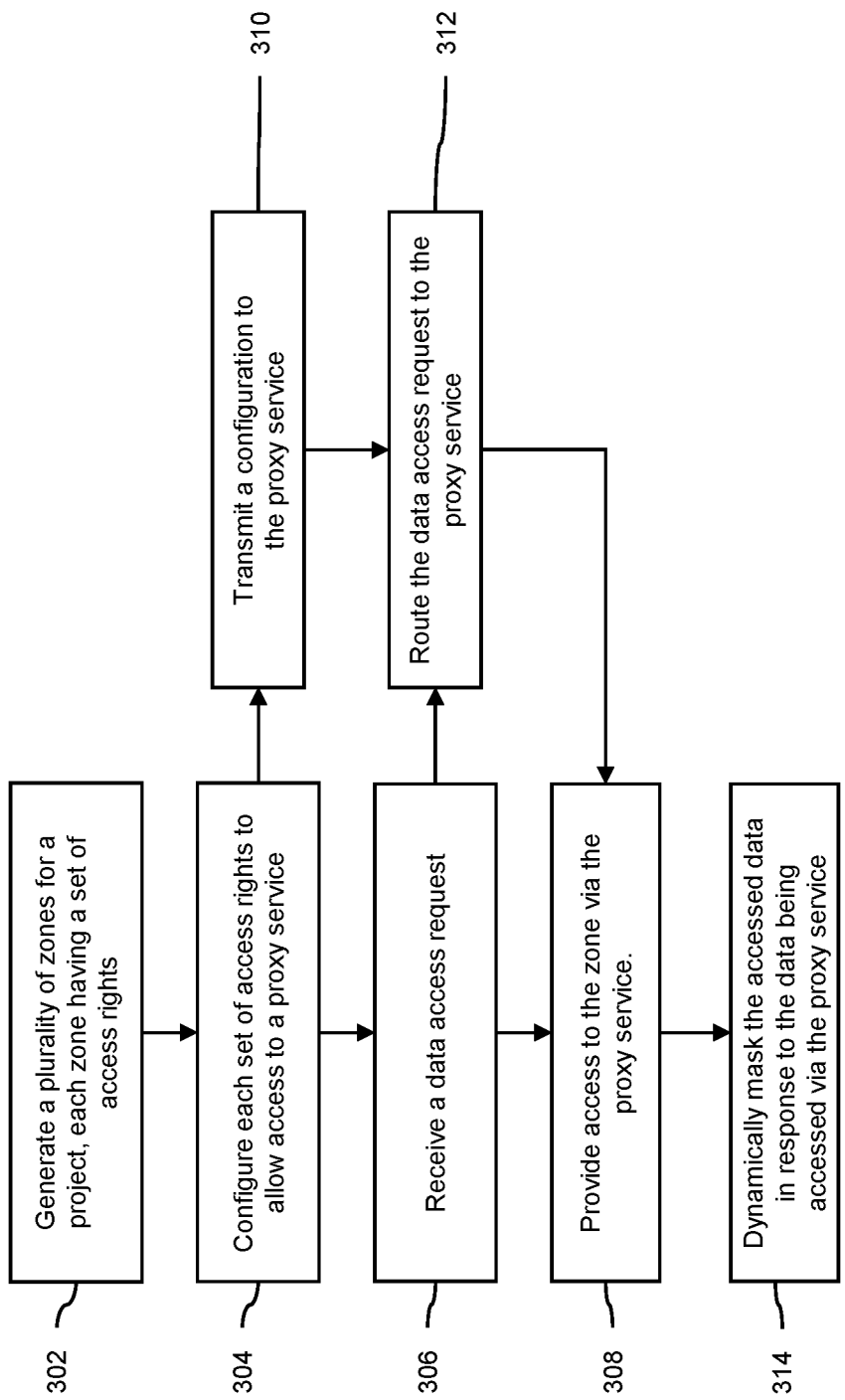
FIG. 3B is a flow diagram of another example of computer executable instructions for controlling access to project data.
Figure 4:
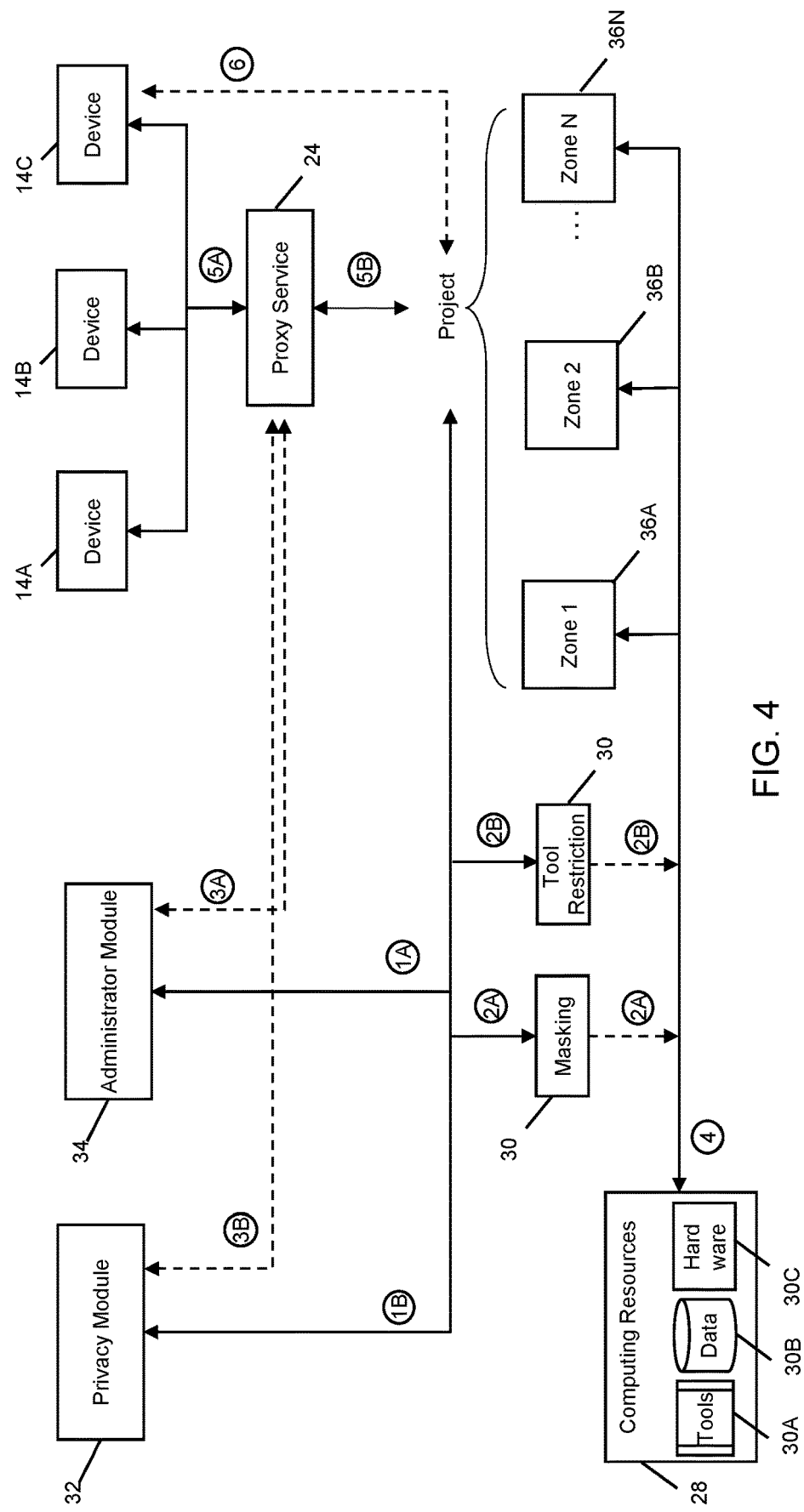
FIG. 4 is a block diagram of another example configuration of a computing environment for controlling access to project data.

Reference is now made to FIGS. 3 and 4, which show flow diagrams of examples of computer executable instructions for controlling access to project data. The methods represented by the flow diagrams of FIGS. 3 and 4 shall be, for the ease of illustration, discussed with reference to the example configuration shown in FIG. 5.

At block 302, the RPM generates or defines a plurality of zones 36 for a project. Each zone 36 may be configured with a default set of access rights, or the generation process may require that the full set of access rights required by any generated zones 36 be configured by the RPM.

In some example embodiments, to overcome lengthy approval processes, the RPM can allow for the generation of subzones or dependent zones. These zones may be generated having up to the access rights of the zone 36 upon which the subzone depends. In this way, devices 14 can generate multiple subzones to further organize a project. The devices may similarly be able to automatically add devices 14 to the registration within the proxy service 24 to enable device 14 consistency between the zone and sub-zone.

Conversely, subzones can be used to manage different access for devices 14. For example, senior developer associated devices 14 may access a parent zone, while junior developer associated devices 14 may only be able to access subzones, preventing the devices 14 registered to the sub-zone the ability to access computing resources which have enterprise wide implications.

In example embodiments, not shown, the RPM generates one or more zones 36 for access by other than the proxy service 24. As described herein, to accommodate certain legacy architecture, or application interoperability (e.g., certain departments within an organization may no longer be supported, and as a result may not be compatible with newer software solutions), these bypass zones 36 can be accessed directly. For example, the RPM can allow access to bypass zones 36, hosted on jump zones (e.g., local datastores) by a desktop client tool to mitigate client device security characteristics.

At block 304, the RPM configures to the proxy service 24 to receive and allow devices 14, or accounts associated with devices 14, to access at least one of the zones 36. In example embodiments, the proxy service 24 is not managed by the administrator of the computing environment 8, the RPM transmits configuration instructions to the proxy service 24 (block 310).

In example embodiments where the proxy service 24 is managed by the administrator of the computing environment 8, the proxy service 24 can be configured to allow for device or application interoperability of expected devices 14. For example, where the proxy service 24 can be configured with APIs to allow for different applications to access the proxy service 24, certain configuration settings may be adjusted to ensure compatibility with security applications known to be installed on the devices 14, etc.

In at least some example embodiments, the RPM either delists a zone 36 from a project, removing the zone 36 from the project, and therefore removing all access rights devices 14 enjoyed to the zone 36. In some embodiments, the RPM reconfigures a zone 36 to remove all access rights, effectively removing the zone 36.

At block 306, the RPM receives a data access request to access one or more zone 36 from at least one of the devices 14. In example embodiments, the RPM receives the request via the proxy service 24, indirectly. For example, the request may be directed to the proxy service 24, which may confirm the credentials of the requesting device 14 and forward the request to the RPM. In this example embodiment, the transmission of the request by the proxy service 24 can be interpreted by the RPM as an acknowledgement that the device 14 which generated the data access request is registered with the proxy service 24 for access to the requested zones 36 (as otherwise the proxy service 24 would not have forwarded the request). In some example embodiments, as shown at block 312 in FIG. 4, the RPM may receive the request directly, and route the request to the proxy service 24 to confirm the requester device 14's status with the proxy service 24. In yet further example embodiments, the proxy service 24 receives the requests directly, and grants access to the zone 36 upon access criteria being satisfied by the device 14.

At block 308, the RPM provides access to the requested zone 36. In this way, the proxy service 24 can be used to control which devices 14 are able to transmit valid requests to the RPM, and once the RPM receives the request from the proxy service 24, access can be granted.

In at least some example embodiments, the access is provided by the proxy service 24 directly, with RPM approval being granted implicitly owing to the registrations within the proxy service 24.

At block 314, in FIG. 4, the RPM can, in response to access to the computing resources being provided via the proxy service 24, dynamically mask any data accessed via the proxy service 24 in accordance with the one or more policies applicable to the zones 36. For example, devices 14 accessing the zone 36 via a particular instance of the proxy service 24 may be unable to see customer names other than initials. In example embodiments, the masking is dynamic in that the masking is applied only once the device 14 requests access to the computing resource. For example, the zone 36 may be configured to access the data 30B, generally, and the privacy module 32 specifies that the zone 36 accesses the data 30B subject to dynamic masking (e.g., process 2A shown in FIG. 4). Thereafter, a processor associated with the data 30B can be configured to, upon receipt of a request (e.g., process 4 shown in FIG. 4) via the zone 36, process raw data stored in data 30B such that only masked data is transmitted to the zone 36. Alternatively, data which is already masked may be provided to the zone 36 to be stored as a local instance. Dynamic masking in this fashion may allow for reduced computing load required to access data, as masking may reduce the amount of data being transmitted internally. This may be particularly important owing to any additional load experienced by the devices 14 as a result of channeling transmissions through the proxy service 24. Moreover, the dynamic masking can prevent certain data breaches, or decrease the severity of the breach, as a result of data not being transmitted to the zone 36.

In example embodiments, updates to the zone 36 access rights updates the access to the computing resources enjoyed by the device 14. For example, upon changes to the status (e.g., completion, partial completion, etc.) of a project or a task organized as a subgroup within a project, the administrator module 34 or the privacy module 32 can update a zone's access rights, or data masking policy, to remove all access rights. In some embodiments, this functionality is automated or timed. In this manner, automatic access right management based on project or task completion can be implemented or avoid errors owing to resource access management.

The proxy service 24 can also be configured to change the status of individual devices 14. For example, upon the request of the administrator module 34, the proxy service 24 can disassociate a device 14 with a particular zone 36, preventing that device 14 from accessing the zone.

Referring now to FIG. 4. a block diagram of an example configuration of a computing environment for controlling access to project data is shown.

In the processes denoted by reference numerals 1A and 1B, the privacy module 32 and the administrator module 34 configure one or more zones (e.g., the shown zones 36A, 36B, and 36C). It is noted that, for clarity, the processes 1A and 1B are shown interacting with the project generally, and not with the specific zones. It is understood that this diagram signifies that the privacy module 32 and the administrator module 34 can interact with individual zones 36, or a central application which generates zones 36 for a project.

In example embodiments, pursuant to process 1A, the administrator module 34 is responsible for configuring registrations of devices (e.g., devices 14A, 14B, and 14C) in relation to the project with the proxy service 24. For example, the administrator module 34 can control registration of the particular proxy service 24 used to access the project, and enforce access criteria for all attempts to access the project via the proxy service 24. In at least some example embodiments, the administrator module 34 is used to specify the computing resources which are available to the project. For example, the administrator module 34 can be used to configure zones 36 related to a particular project can only access resources local to the jurisdiction where any restricted data originates from, and not, for example, the shown generally available computing resources 28.

Access to the administrator module 34 can be granted solely by devices or accounts of administrators aware of personnel logistics within the computing environment 8, or aware of computing resource limitations. For example, an account associated with a project owner may be granted access to the administrator module 34 to configure which restricted computing resource should be available to the project, and which other devices or user accounts should have access to the zones 36 (individually, or collectively) of the project. The administrator module 34 can configure individual zones 36, such that each zone is unique, whether in relation to devices or accounts that have access to the zones, or in relation to the restricted computing resources that are available to the zone 36, or a combination of both. For example, as shown by process 3B, the administrator module 34 can configure two zones of the zones 36 (e.g., zone 36A and zone 36B), via the proxy service 24, to have the same access to restricted computing resources delivered via process 4 but allow access to different devices to each respective zone. The two zones 36 may rely upon different proxy services 24, or different instances of the proxy service 24, owing to their servicing different departments within the project (e.g., one zone 36A is for programmers, while another zone 36B may be for business users or testers).

Pursuant to the process 1B, the privacy module 32 can be used to control whether restricted data is copied locally or otherwise distributed throughout the computing environment 8, whether a masking policy is associated with the accessed or stored data or computing resources (e.g., tools), data retrieval frequency, and other privacy related configurations associated with restricted computing resources.

Processes 2A and 2B involves the privacy module 32 configuring one or more of the zones 36 via the request sent by the zone 36 to the computing resources 28, or via configuration of the computing resources 28 directly. For example, in implementing the masking policy in process 2A, the privacy module 32 can augment or enforce a request syntax to any request sent from zone 36 to specify the masking policy. In at least one example embodiment, the privacy module 32 configures a processor related to the computing resources 28 directly to mask resources in response to requests originating from the zones 36. The privacy module 32 can similarly enforce any configurations with request(s) to the tools 30A accessed by the zones 36. For example, the privacy module 32 can restrict access to tools 30A available to the individual zone 36, or disable certain functionality associated with tools 30A if a local copy (e.g., on a jump server) is stored locally.

At process 3A and 3B, the privacy module 32, or the administrator module 34, or both, transmit configuration details to the proxy service 24. For example, the administrator module 34 can register or associate devices 14 with one zone 36 (e.g., device 14A is registered with zone 36A, and so forth), or more than one zone 36 simultaneously. The privacy module 32 may implement the request syntax discussed in relation to process 2A or 2B in step 3B, directly at the proxy service 24.

At process 4, the zones 36 can be populated with local computing resources. For example, data may be stored on the local database 44, tools such as applications can be replicated, etc.

At process 5A, the devices 14 transmit a request to access one or more zones 36 of the project, to the proxy service 24. The proxy service 24 applies one or more criteria to determine whether the device 14, or an account associated with the device 14, is permitted access to the zone 36. For example, the proxy service 24 can implement criteria related to the location of the device 14 (e.g., the device 14A may be in an unauthorized jurisdiction), the credentials of the device 14 (e.g., an incorrect IP address), the credentials of the account associated with the device 14 (e.g., wrong access credentials or incorrect two step authentication), and so forth. In at least some example embodiments, the criteria are learned via a machine learning process.

The proxy service 24 can also enforce a communication protocol. For example, the proxy service 24 can require the device 14 to communicate according to a protocol specified by the zone 36). In this way, the proxy service 24 can support the interoperability between the zone 36 and different device 14 configurations.

At process 5B, in response to the proxy service 24 determining that the request transmitted in 5A satisfies the one or more criteria, the proxy service 24 can grant access to zone 36 to the requesting device 14. The zones 36 can be configured to reject any requests to access which do not originate from the proxy service 24. In example embodiments, the location of the zones 36 is itself obfuscated or unknown to devices 14 within the computing environment 8, requiring the devices 14 to direct all access requests to the proxy service 24 via an RPM.

Optionally, as shown by process 6, one or more zones 36 can be configured to respond to requests to access computing resources directly from devices (e.g., device 14C), to overcome technical challenges associated with software compatibility.

Figure 5:
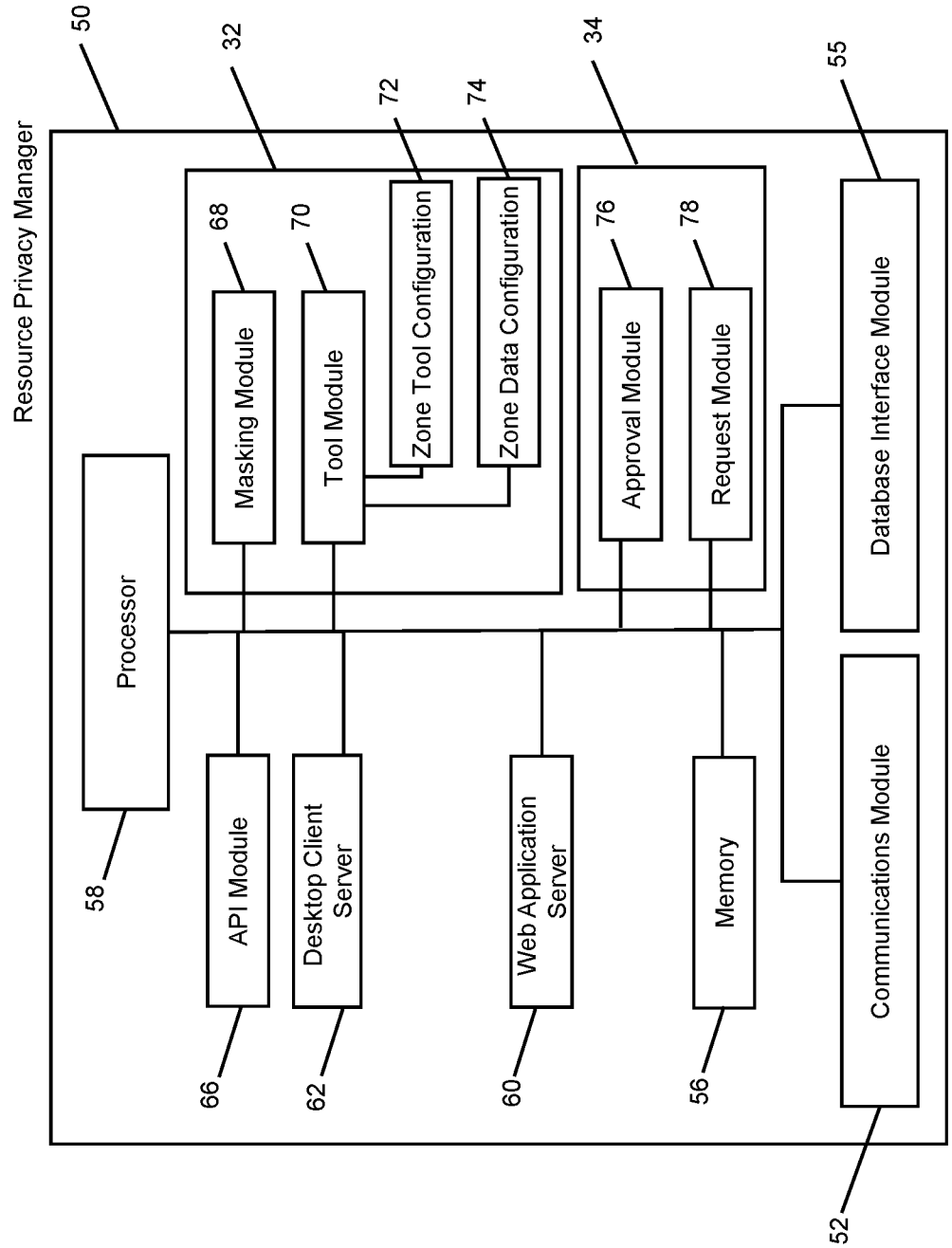
FIG. 5 is a block diagram of an example configuration of a resource privacy manager.

FIG. 5 shows an example configuration of an RPM 50. The RPM 50 includes a communications module 52 that enables the RPM 50 to communicate with one or more other components of the computing environment 8, such as the project environment 10, project environment 12, or proxy service 24, via a bus or other communication network, such as the communication network 16. The RPM 50 includes at least one memory or memory device 56 that can include a tangible and non-transitory computer-readable medium having stored therein computer programs, sets of instructions, code, or data to be executed by one or more processors (shown as a singular processor 58). It can be appreciated that any of the components shown in FIG. 6 may also be hosted externally and be available to the RPM 50, e.g., via the communications module 52.

In the example embodiments, the RPM 50 includes or is composed of one or more servers to provide access to client data, e.g., to assist managing access to restricted data (e.g., data accessed via the communications module 52 or the database interface module 55 or stored in memory 56). In the shown embodiment, the exemplary servers include a web application server 60 and a desktop client server 62. Although not shown in FIG. 6, the RPM 50 may also include a cryptographic server for performing cryptographic operations and providing cryptographic services. The cryptographic server can also be configured to communicate and operate with a cryptographic infrastructure. The RPM 50 may also include one or more data storage elements for storing and providing data for use in such services, such as memory 56.

Desktop application server 62 supports interactions with a desktop application installed on device 14 (e.g., SSMS, Tableau Desktop (TBD), Excel, etc.). Web application server 60 can access other resources of the RPM 50 to carry out requests made by, and to provide content and data to, a web application on device 14. In certain example embodiments, web application server 60 allows for a mobile device 14 to access the RPM 50.

Web application server 60 supports interactions using a website accessed by a web browser application running on the device 14. It can be appreciated that the desktop application server 62 and the web application server 60 can provide different front ends for the same application, that is, the desktop application (operating system based) and web (browser) versions of the same application. For example, the RPM 50 may provide access to a room operating pursuant to a software development environment that can be accessed via a smartphone or tablet app while also being accessible via a browser on any browser-enabled device.

The memory 56 can include, in an example embodiment, financial data that of customers of the financial institution, for example, for the purposes of testing. The financial data may include any data related to or derived from financial values or metrics associated with customers of a financial institution system, for example, account balances, transaction histories, line of credit available, credit scores, mortgage balances, affordability metrics, investment account balances, investment values and types, among many others.

The memory 56 can also include information associated with the accounts which access the rooms, or the devices 14 used to access the zones. For example, the memory 56 can include a log of all devices 14 which enter a particular zone, an arrival timestamp, etc. Other metrics related to the zones or the devices 14 can also be stored in the memory 56.

The RPM 50 includes an application programming interface (API) module 66 configured to make API calls on behalf of, or to facilitate, a zone interacting with one or more different endpoints (e.g., different computing environments, such as project environment 12, or different computing resources such as computing resources 28). The API module 66 can therefore maintain the appropriate API calls for the various endpoints in the computing environment 8 that can be interacted with or controlled via, for example, a particular zone 36, or a proxy service 24, etc. The API module 66 can be coupled to one or more internal APIs (not shown) that connect into the various endpoints. In addition, the API module 66 can interface with other internal components or third-party components. For example, the API can be used to allow devices 14 or applications associated with a third-party service provider to the computing environment 8 to seamlessly integrate into a project.

As alluded to herein, the RPM 50 can include the privacy module 32, comprising the masking module 68 and the tool module 70, and the administrator module 32, comprising the approval module 76 and the request registration module 78.

Figure 6:
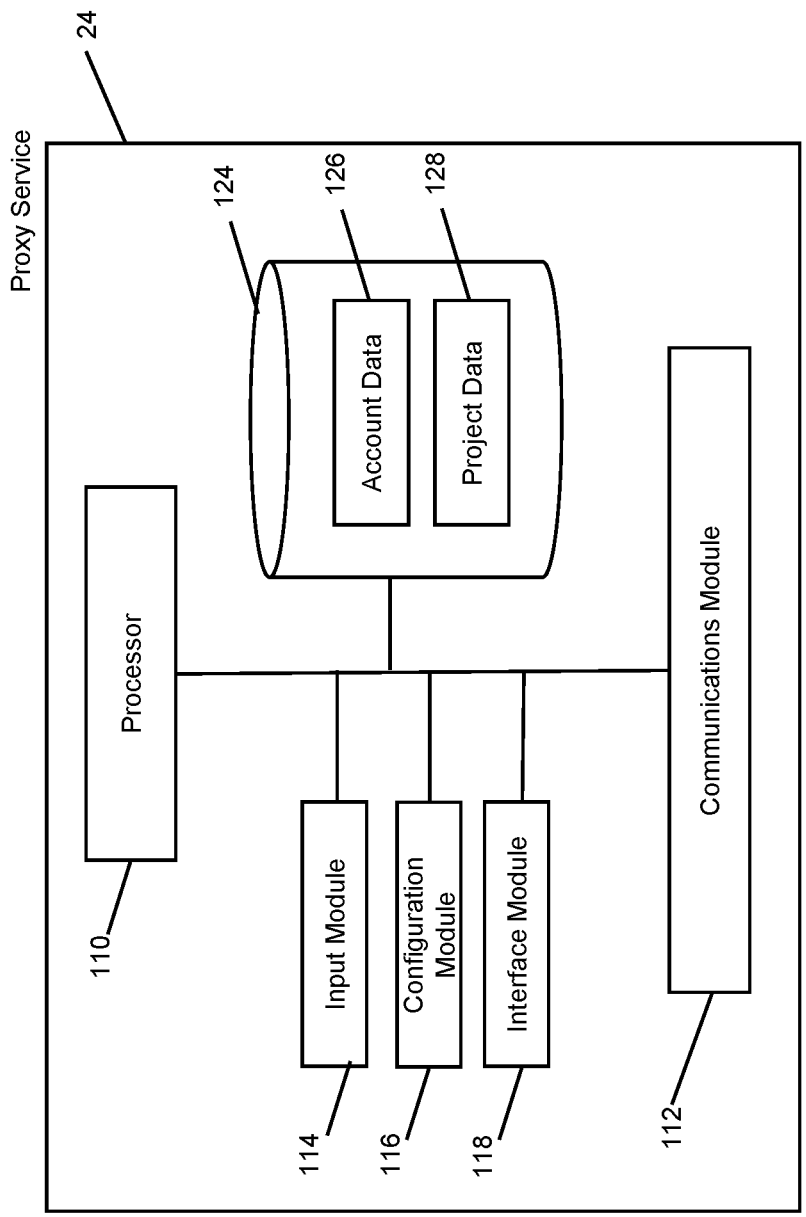
FIG. 6 is a block diagram of an example configuration of a proxy service.

A tool module 70 is shown in the example configuration of FIG. 6 to illustrate that the RPM 50 can host and provide its own tools to deploy within the zones 36. Zone tool configuration module 72 can be configured to define access rights for each zone 36, positively (i.e., access is only allowed to specified tools), or negatively (i.e., access is not allowed to the specified tools). Similarly, the zone data configuration module 74 can be configured to define access rights for each tool within the zone 36. For example, certain tools may include functionality, or which can be configured to, access a wide variety of different data (e.g., machine learning models which can be trained with any particular data provided). While the tool may be improved with increase access to data, the zone data configuration module 74 can be configured to prevent the tool from such broad data access, for example, to maintain data privacy, or in furtherance of a security scheme to prevent unauthorized access, or to prevent cherry picked are inherently biased data inadvertently migrating into different tool applications.

It can be appreciated that the tool module 70 can be utilized in conjunction with a third-party deployment environment such as an independent provider's system to have test various tools being sold, where the third-party development can include testing by employees and customers/clients.

The masking module 68 can be used to enforce one or more policies related to data privacy. The one or more policies may apply only to data stored locally (e.g., the memory 56), or to any data accessed by the particular zone 36. More than one policy of the one or more policy can apply to accessed data; different policies may also apply to data having a different nature (e.g., one policy for financial data, another policy for personal information) or originating from a different computing resource 28 (e.g., data policies may discriminately apply to data originating from the project environment 10, but not the project environment 12).

The request module 78 of the administrator module 34 receives requests to generate an instance of a zone 36, or to generate instances of multiple zones 36. In example embodiments, the request module 48 is accessible to a plurality of devices 14 or accounts associated therewith to facilitate easy registrations of a zone 36. In at least some example embodiments, the request module 78 only receives or processes requests from authorized devices 14 (e.g., the request module 78 is configured to only respond to requests to generate an instance of the zones 36 from a project manager user). The request module 78 can enforce criteria in order to process a request: the request module 78 can (1) specify a syntax associated with the request, (2) specify an originating device 14, (3) require authentication, and so forth.

The approval module 76 of the administrator module 34 is configured to further process the requests received by the request module 78. Devices 14, or accounts associated therewith, with access to the approval module 76, do not have access to the request module 78. In this way, multiple layers of security are involved in generating the zone 36 with appropriate permissions to computing resources 28. In at least some example embodiments, there is some overlap between the devices 14, or accounts associated therewith, which have access to the approval module 76 and the request module 78.

The approval module 76 approves or denies requests to access computing resources 28. In at least some example embodiments, the approval module 76 automatically approves or denies the request. For example, the approval module 76 may automatically approves a request access computing resources 28 where the computing resources 28 were used in a similar project. In another example, the approval module 76 may automatically deny a request where the requested computing resources 28 are unavailable in the location where the zone 36 will be hosted.

In FIG. 6, an example configuration of a proxy service 24 is shown. It can be appreciated that the proxy service 24 shown in FIG. 7 can be hosted external to computing environment 8, on a device (e.g., a server, or device 14) within the computing environment 8, or within a sub-environment within the computing environment 8, such as the project environment 12. In at least some example embodiments, the proxy service 24 may be hosted on a virtual device. In certain embodiments, the proxy service 24 may include one or more processors 110, a communications module 112, and a data store 124 storing account data 126 and project data 128. Communications module 112 enables the proxy service 24 to communicate with one or more other components of the computing environment 8 via a bus or other communication network, such as the communication network 16. While not delineated in FIG. 6, the proxy service 24 includes at least one memory or memory device that can include a tangible and non-transitory computer-readable medium having stored therein computer programs, sets of instructions, code, or data to be executed by processor 110, similar to memory 56. FIG. 6 illustrates examples of modules and applications stored in memory on the proxy service 24 and operated by the processor 110. It can be appreciated that any of the modules and applications shown in FIG. 6 may also be hosted externally and be available to the proxy service 24, e.g., via the communications module 112.

In the example embodiment shown in FIG. 6, the proxy service 24 includes an input module 114 for processing user or other inputs received at the proxy service 24, e.g., via a touchscreen, input button, transceiver, microphone, keyboard, etc. It can be appreciated that the proxy service 24 can receive inputs via the communication module 112, without the need for an input module 114. The proxy service 24 may also include a configuration module 116 that includes the latest configurations as to which devices 14 are registered to use the proxy service 24, and the permissions (e.g., access permissions to zones 26) associated with the registered devices. The proxy service 24 can include an interface module 118 to enable the proxy service 24 to interface with different environments (e.g., project environment 12), or different devices (e.g., devices 14), or different applications (e.g., a desktop application, a web application, a third-party application) for either determining whether to grant access to a zone 36 based on the registration, or to facilitate access to the zones 36 via the proxy service 24. For example, the interface module 118 can include an API (not shown) or similar type of feature to facilitate a remote login functionality via WebEx™. The data store 124 may be used to store account data 126, such as, but not limited to, an IP address or a MAC address that uniquely identifies a device 14, or an account number or other login credentials associated with a user of the device 14. The data store 124 may also be used to store project data 128, such as, but not limited to, zone 36 locations, jump servers associated with particular zones 36, login credentials, user preferences, cryptographic data (e.g., cryptographic keys), etc.

Figure 7:
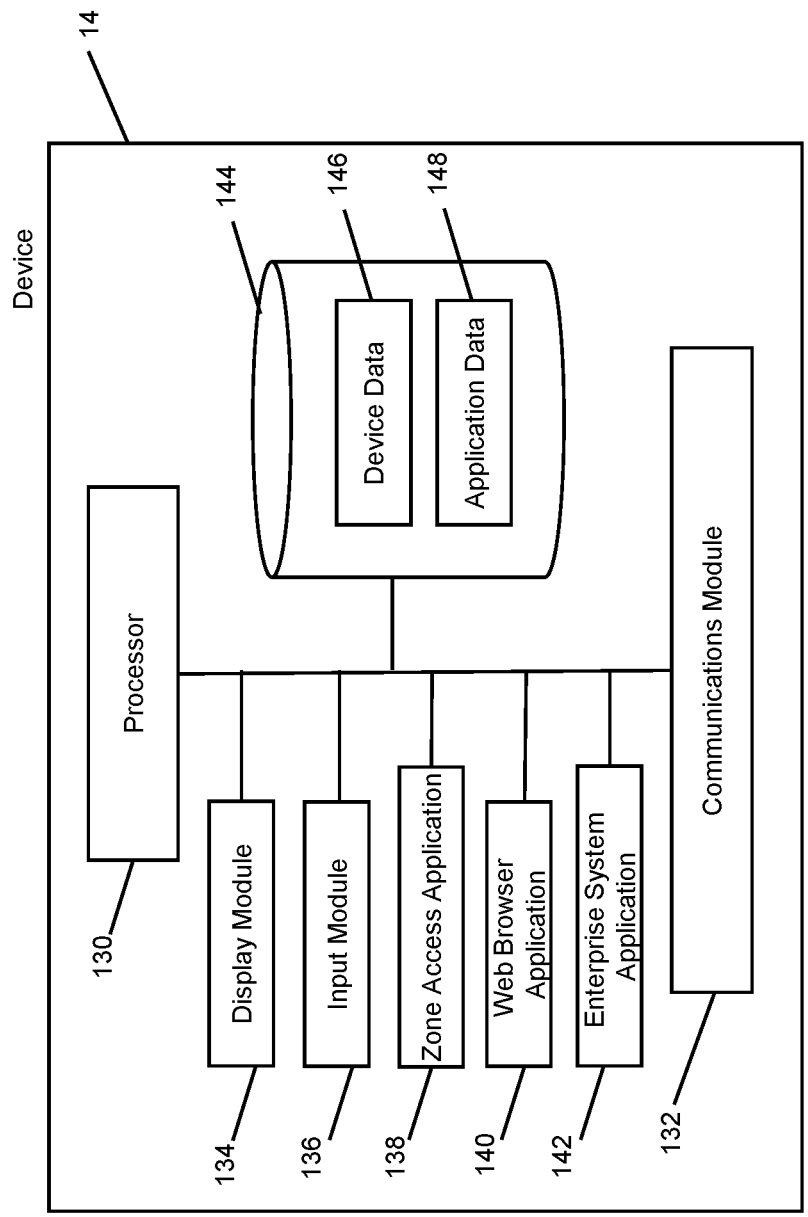
FIG. 7 is a block diagram of an example configuration of a device used to interface with, for example, the system for controlling access to computing resources.

A device 14 can include components similar to the proxy service 24. For example, in FIG. 7, an example configuration of the device 14 is shown. In certain embodiments, the device 14 may include one or more processors 130, a communications module 132, and a data store 144 storing device data 146 and application data 148. Communications module 132 enables the device 14 to communicate with one or more other components of the computing environment 8, such as the proxy service 24, via a bus or other communication network, such as the communication network 16. While not delineated in FIG. 7, the device 14 includes at least one memory or memory device that can include a tangible and non-transitory computer-readable medium having stored therein computer programs, sets of instructions, code, or data to be executed by processor 130. FIG. 7 illustrates examples of modules and applications stored in memory on the device 14 and operated by the processor 130. It can be appreciated that any of the modules and applications shown in FIG. 7 may also be hosted externally and be available to the device 14, e.g., via the communications module 132.

In the example embodiment shown in FIG. 7, the device 14 includes a display module 134 for rendering GUIs and other visual outputs on a display device such as a display screen, and an input module 136 for processing user or other inputs received at the device 14, e.g., via a touchscreen, input button, transceiver, microphone, keyboard, etc. The device 14 may also include a zone access application 138, which may take the form of a customized app, plug-in, widget, or software component provided by the proxy service 24 or the administrator of the computing environment 8 for use by the device 14 to use the zones 36. In some example embodiments, the device 14 includes an enterprise system application 142 to generally access the computing environment 8, which application includes the functionality of the zone access application 138. The device 14 in this example embodiment also includes a web browser application 140 for accessing Internet-based content, e.g., via a mobile or traditional website. The data store 144 may be used to store device data 146, similar to account data 126. The data store 144 may also be used to store application data 148, such as, but not limited to, login credentials, user preferences, cryptographic data (e.g., cryptographic keys), etc.

It will be appreciated that only certain modules, applications, tools and engines are shown in FIGS. 1A, 1B, 2, and 5 to 8 for ease of illustration and various other components would be provided and utilized by the project environment 10, project environment 12, proxy service 24, device 14, and/or the RPM 50 as is known in the art. Furthermore, it can be appreciated that the various elements of the project environment 10, project environment 12, proxy service 24, device 14, and/or the RPM 50 are shown delineated as such in the figures for illustrative purposes and clarity of description and could be provided using other configurations and distribution of functionality and responsibilities.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of any of the servers or other devices in the project environment 10, project environment 12, proxy service 24, RPM 50, device 14, or test device 22, or accessible or connectable thereto. Any application or module herein described may be implemented using computer readable/executable instructions that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A system for controlling access to project data, the system comprising at least one server device comprising:
a processor;
a communications module coupled to the processor; and
a memory coupled to the processor, the memory storing computer executable instructions that when executed by the processor cause the at least one server device to:
generate a plurality of zones for a project, each zone defining a set of access rights to: i) at least one dataset in a database associated with the project; and ii) at least one tool configured to operate on the at least one dataset;
configure each set of access rights associated with a zone to allow a proxy service to access the at least one dataset and the at least one tool for that zone;
provide the proxy service with a configuration for each set of access rights, the configuration defining one or more criteria to determine whether client devices are permitted to access the corresponding zone;
receive, from a client device and via the proxy service, a data access query to access at least one zone of the plurality of zones;
determine, via the proxy service, that the client device is permitted to access the at least one zone; and
provide the client device access to, via the proxy service, the at least one dataset and at least one tool of the at least one zone specified in the data access query.

2. The system of claim 1, wherein the computer executable instructions further cause the processor to:
in response to access to the dataset being granted via the proxy service, dynamically mask the dataset based on a policy defined for the at least one zone according to which the at least one dataset is accessed.

3. The system of claim 2, wherein the computer executable instructions further cause the processor to:
redirect data access queries to the plurality of zones from the client device to the proxy service.

4. The system of claim 1, wherein the computer executable instructions further cause the processor to:
update the unique set of access rights or a data masking policy associated with the at least one dataset based on a status of the project.

5. The system of claim 1, wherein the computer executable instructions further cause the processor to:
associate the client device, within the proxy service, with at least one further zone of another project.

6. The system of claim 1, wherein the computer executable instructions further cause the processor to:
associate the client device, within the proxy service, with more than one zone of the plurality of zones in the project simultaneously.

7. The system of claim 1, wherein the computer executable instructions further cause the processor to:
update the proxy service to disassociate the client device and a zone of the plurality of zones to remove access by the client device to the zone.

8. The system of claim 1, wherein the computer executable instructions further cause the processor to:
generate a further zone;
assign the further zone to the project, wherein the further zone has a subset of the access rights of the at least one zone; and
assign at least one client device to the further zone, preventing the at least one client device from having all access rights associated with the at least one zone.

9. The system of claim 1, wherein the computer executable instructions further cause the processor to:
modify the unique set of access rights for the at least one zone, changing access rights to either the at least one dataset or the at least one tool for all client devices associated with the at least one zone.

10. The system of claim 1, wherein a dataset of the at least one dataset is hosted on a jump server, and the dataset is directly accessible by a desktop client tool to mitigate client device security characteristics.

11. The system of claim 1, wherein the computer executable instructions further cause the processor to:
update the unique set of access rights to remove access, via the proxy service, to the at least one zone, removing the at least one zone from the project.

12. A method of controlling access to project data, the method executed by at least one server device comprising:
generating a plurality of zones for a project, each zone defining a set of access rights to:
i) at least one dataset in a database associated with the project; and ii) at least one tool configured to operate on the at least one dataset;
configuring each set of access rights associated with a zone to allow a proxy service to access the at least one dataset and the at least one tool for that zone;
providing the proxy service with a configuration for each set of access rights, the configuration defining one or more criteria to determine whether client devices are permitted to access the corresponding zone;
receiving, from a client device and via the proxy service, a data access query to access at least one zone of the plurality of zones;
determining, via the proxy service, that the client device is permitted to access the at least one zone; and
providing the client device access to, via the proxy service, the at least one dataset and at least one tool of the at least one zone specified in the data access query.

13. The method of claim 12, further comprising:
in response to access to the dataset being granted via the proxy service, dynamically masking the dataset based on a policy defined for the at least one zone according to which the at least one dataset is accessed.

14. The method of claim 13, further comprising:
redirecting data access queries to the plurality of zones from the client device to the proxy service.

15. The method of claim 12, further comprising:
updating the unique set of access rights or a data masking policy associated with the at least one dataset based on a status of the project.

16. The method of claim 12, further comprising:
associating the client device, within the proxy service, with at least one further zone of another project.

17. The method of claim 12, further comprising:
associating the client device, within the proxy service, with more than one zone of the plurality of zones in the project simultaneously.

18. The method of claim 12, further comprising:
updating the proxy service to disassociate the client device and a zone of the plurality of zones to remove access by the client device to the zone.

19. The method of claim 12, further comprising:
modifying the unique set of access rights for the at least one zone, changing access rights to either the at least one dataset or the at least one tool for all client devices associated with the at least one zone.

20. A non-transitory computer readable medium for controlling access to project data, the computer readable medium comprising computer executable instructions for:
generating a plurality of zones for a project, each zone defining a set of access rights to:
i) at least one dataset in a database associated with the project; and ii) at least one tool configured to operate on the at least one dataset;
configuring each set of access rights associated with a zone to allow a proxy service to access the at least one dataset and the at least one tool for that zone;
providing the proxy service with a configuration for each set of access rights, the configuration defining one or more criteria to determine whether client devices are permitted to access the corresponding zone;
receiving, from a client device and via the proxy service, a data access query to access at least one zone of the plurality of zones;
determining, via the proxy service, that the client device is permitted to access the at least one zone; and
providing the client device access to, via the proxy service, the at least one dataset and at least one tool of the at least one zone specified in the data access query.

* * * * *